United States Patent
Nicklaus et al.

(10) Patent No.: US 8,743,458 B2
(45) Date of Patent: Jun. 3, 2014

(54) OPTICAL INSULATOR WITH PARALLELEPIPED MAGNETS

(75) Inventors: Kolja Nicklaus, Friedrichshafen (DE); Gerrit Seyffert, Jena (DE)

(73) Assignee: TRUMPH Laser GmbH + Co. KG (DE)

( * ) Notice: Subject to any disclaimer, the term of this patent is extended or adjusted under 35 U.S.C. 154(b) by 241 days.

(21) Appl. No.: 13/263,706

(22) PCT Filed: Mar. 13, 2010

(86) PCT No.: PCT/DE2010/000273
§ 371 (c)(1),
(2), (4) Date: Apr. 13, 2012

(87) PCT Pub. No.: WO2010/115392
PCT Pub. Date: Oct. 14, 2010

(65) Prior Publication Data
US 2012/0194906 A1 Aug. 2, 2012

(30) Foreign Application Priority Data
Apr. 9, 2009 (DE) .......................... 10 2009 016 950

(51) Int. Cl.
*G02F 1/09* (2006.01)
(52) U.S. Cl.
USPC ................................................. 359/484.03
(58) Field of Classification Search
USPC ........................................ 359/484.02, 484.03
See application file for complete search history.

(56) References Cited

U.S. PATENT DOCUMENTS

| | | | |
|---|---|---|---|
| 4,756,607 A | 7/1988 | Watanabe et al. | |
| 5,428,335 A | 6/1995 | Leupold et al. | |
| 5,528,415 A | 6/1996 | Gauthier et al. | |
| 6,462,872 B2 | 10/2002 | Watanabe et al. | |
| 6,480,636 B1 | 11/2002 | Satoh et al. | |
| 6,816,300 B2 | 11/2004 | Shirai et al. | |
| 6,906,843 B2 * | 6/2005 | Nagasawa et al. | 359/280 |
| 7,127,130 B2 * | 10/2006 | Shou | 385/11 |
| 7,194,283 B2 | 3/2007 | Kardach et al. | |
| 7,206,116 B2 | 4/2007 | Fehn et al. | |
| 7,336,858 B1 | 2/2008 | Moore et al. | |
| 2003/0002128 A1 * | 1/2003 | Watanabe | 359/280 |
| 2004/0013343 A1 | 1/2004 | Hoshikawa et al. | |

(Continued)

FOREIGN PATENT DOCUMENTS

EP 0415444 A2 3/1991
EP 1660931 B1 8/2007

(Continued)

OTHER PUBLICATIONS

International Search Report in PCT/DE2010/000273 dated Jul. 19, 2010.

*Primary Examiner* — Frank Font
(74) *Attorney, Agent, or Firm* — Michael D. Bednarek; Axinn Veltrop Harkrider LLP

(57) ABSTRACT

The present invention relates to an optical insulator for high power optical radiation. The arrangement of the optical insulator comprises a Faraday rotator, comprising one or more Faraday media (4) and a magnet assembly (1) that allows for the receiving of multiple Faraday media (4). A polarizer assembly is arranged both in front of and behind the Faraday media (4). The magnet assembly (1) is formed by magnets (2) shaped in such a way that at least the outer-lying magnets are parallelepiped. The free aperture (3) is surrounded by three magnetic levels (12, 12', 12").

16 Claims, 11 Drawing Sheets

(56) References Cited

U.S. PATENT DOCUMENTS

2004/0032657 A1 2/2004 Shirai et al.
2004/0204031 A1 10/2004 Kardach et al.
2006/0013076 A1 1/2006 Kishimoto et al.

FOREIGN PATENT DOCUMENTS

| JP | 10-227996 A | | 8/1998 | |
|---|---|---|---|---|
| JP | 2003315736 A | * | 11/2003 | ............... G02B 7/00 |
| WO | 2005019914 A1 | | 3/2005 | |

* cited by examiner

OPTICAL INSULATOR WITH PARALLELEPIPED MAGNETS

CROSS-REFERENCE TO RELATED APPLICATIONS

This application is a U.S. National Stage of International Application PCT/DE2010/0002373 filed Mar. 13, 2010, which claims priority to German patent application number DE 102009016950.4 filed Apr. 9, 2009.

The present invention relates to an optical insulator for high power optical radiation. An optical insulator of this type consists of a polarization rotator on the basis of the Faraday effect and one polarization arrangement disposed upstream thereof and one polarization arrangement disposed downstream thereof.

Optical insulators are established e.g. in the field of optical telecommunications both for polarized and for unpolarized radiation. These insulators are used for a power of up to approximately 1 W and utilize ferromagnetic Faraday-active media (so-called Faraday media) having a very large Verdet constant, such as e.g. YIG or BIG crystals, for rotating the polarization of the optical electromagnetic field. Due to the large Verdet constant, comparatively small magnetic fields are sufficient, which can be generated e.g. by a simple small permanent magnet.

The conventional ferromagnetic Faraday media are not suited for a high power range of a few Watts and more of average optical power due to their poor optical quality and high absorption. Paramagnetic crystals and glasses are typically used in this case, such as e.g. Tb:glass or TGG crystals having a Verdet constant that is smaller by one to two magnitudes. With a Verdet constant of TGG of 22.7°/(Tcm) and a wavelength of 1064 nm, the required crystal length for a polarization rotation of 45°, as it is required in Faraday insulators, is approximately 20 mm with a magnetic field strength of 1 T.

One single permanent magnet is not sufficient for generating a magnetic field of this type over a length of 20 mm with a typical aperture of a few millimeters. Rather, one uses certain magnet arrangements that increase the magnetic field strength in the free aperture and thereby remain as homogeneous as possible across the aperture cross-section.

EP 1 660 931 B1 describes a rotationally symmetrical arrangement that provides a strong homogeneous magnetic field in the free aperture for one single cylindrical Faraday medium. In the case of two Faraday media or a medium having a high aspect ratio, a very large circular free aperture is required, whereby the arrangement requires a lot of space.

U.S. Pat. No. 5,528,415 describes an arrangement of prism-shaped magnets having a trapezoidal base area with rectangular outer dimensions and a square aperture, which also generates a homogeneous field in the area of the enclosed inner circle. For two Faraday media or a medium with high aspect ratio, a very large square free aperture is required, whereby the arrangement again requires a large space. When the arrangement is scaled in only one direction, the magnetic field in the aperture becomes inhomogeneous, thereby impairing rotation of polarization or optical insulation.

Polarization prisms (e.g. Glan-Taylor, Glan, Tompson, Rochon, Wollaston), beam splitting cubes or Brewster polarizers are conventionally used for optical insulators for linearly polarized radiation.

Birefringent prisms that split the radiation into two beams with linear polarization perpendicular with respect to each other, or birefringent beam offsetting devices that produce a parallel offset between two linear polarizations that are perpendicular with respect to each other, are conventionally used for optical insulators for unpolarized radiation.

After passage through the Faraday rotator, these two beams are again spatially and angularly superimposed. The quality factor of the superimposition—i.e. the error in the parallel offset and angle—is decisive for the beam parameters of the recombined beam downstream of the insulator. Whereas a small parallel offset (e.g. caused by beam dividing and beam recombining devices having slightly differing lengths) only causes a slight change in the beam quality, an angular error of a magnitude of approximately 30" already causes displacement of the two polarizations in the focus of approximately 30% with optical fundamental mode radiation, and therefore significant deterioration of the beam quality and the spot size in the focus. 30" angular tolerance represents a very great challenge for the alignment of prisms or the arrangements of individual components.

Calcareous spar is conventionally used for producing birefringent prisms with small optical power. YVO crystals are conventionally used for a high power range. Due to the relatively low birefringence, prisms of this type can only achieve an angle of maximally 3° between the two polarizations such that a large distance or alternatively a room filter is required for separating the beams with a typical beam diameter in the high power range of a few millimeters.

The parallel offset of birefringent beam offsetting devices is approximately 0.1 mm per 1 mm crystal length. This results in very long crystals of a length of a few centimeters for a typical beam diameter in the high power range, wherein the crystals are difficult to produce (and are therefore expensive). The residual absorption in the high power range of a few hundred Watts, moreover, causes thermal lenses in the material, and therefore an undesired change of the beam parameters by the insulator.

In addition to birefringent optics, the use of monolithic components comprising several functional coatings is also known in the art. They can be manufactured with high precision, but are disadvantageous in that their coating process is very complex and therefore expensive, in that they also have a long optical path within the material and in that there are thermal lenses in the material due to residual absorption in the high-power range of a few hundred Watts, which lenses cause an undesired change of the beam parameters.

Arrangements of polarization prisms, beam plate cubes or Brewster polarizers can alternatively be used for separating and recombining beams. In this connection, however, the required parallelism of the surfaces with respect to one another is a particular challenge.

In view of this background, it is the object of the invention to provide a arrangement for an optical insulator for high power optical radiation, which provides a homogeneous magnetic field within the aperture and has a compact size, and combines a minimum thermal lens with highly accurate alignment of the polarizer surfaces with respect to one another.

In accordance with the invention, this object is achieved by an arrangement comprising a Faraday rotator, consisting of one or more Faraday media and a magnet arrangement which enables accommodation of several Faraday media, and one polarizer arrangement upstream and one downstream of the Faraday media, characterized in that the arrangement of the magnetic field is formed from magnets having such a shape that at least the outer magnets are cube-shaped.

The advantage of a magnet arrangement of this type, in which at least the outer magnets have a cube shape, consists in that it enables scaling of the free aperture of the arrangement along a direction, thereby maintaining the homogeneity of 5% (±2.5%) of the magnetic field, which is integrated across the length. This provides a very compact arrangement with simple and therefore inexpensive magnet shapes in contrast to prior art.

The aspect ratio (length/width/depth) of the magnet arrangement must therefore be optimized in dependence on the free aperture and required length of the Faraday medium such that a homogeneous magnetic field, which is integrated across the length, is generated in the free aperture, wherein the deviation of the homogeneity is maximally 5%.

The magnet arrangement advantageously generates a magnetic field of 0.7 T within the aperture. The aperture of the magnet arrangement corresponds to at least the diameter of the Faraday medium and is advantageously smaller than twice this diameter. The aperture can also correspond to a multiple of the diameter of the Faraday medium or a multiple of the maximum double diameter of the Faraday medium, such that several Faraday media can be arranged next to one another within the aperture.

In one exemplary embodiment, the cube-shaped magnets of the magnet arrangement can be chamfered at the outer corners of the arrangement. The length of the edges of the magnet arrangement can e.g. be reduced by up to one fourth of this edge length. This renders the installation space more compact such that the magnet arrangement can be housed in cube-shaped or cylindrical housings, and it is possible to mount fastening devices, such as e.g. screws or alignment pins, at the recessed corners. The edge length of all four edges can be reduced to equal lengths but can also vary.

Spacers can be introduced into the free aperture, which prevent individual magnets from narrowing the free aperture. Spacers of this type are advantageous since the individual magnets of the arrangement can exert large forces on each other due to their magnetization. The spacers can form part of the outer housing, be part of the holder of the Faraday medium or media, be separate components or be melted to the magnets.

The optical insulator can be provided with at least one polarization rotator that enables alignment of the polarizers in one plane, thereby simplifying the overall arrangement of the optical insulator. A polarization rotator of this type is typically arranged between the Faraday medium and one of the polarizer elements and rotates the polarization direction of the optical radiation advantageously together with the Faraday medium in one direction through 0° and in the opposite direction through 90°.

The optical insulator can be designed in such a fashion that, even when the polarizers are not aligned in one plane, the polarizations can be completely superimposed downstream of the insulator. This can be achieved e.g. with birefringent compensators or birefringent beam offsetting devices in order to change the optical path as desired.

One further advantage of the invention consists in that the polarizer arrangement can consist of several components without causing a deviation of more than 10" in the alignment of the polarizer surfaces.

Tb:glass or TGG crystals can e.g. be used as Faraday media. The form of Faraday media is typically rod-shaped, but can also have a high aspect ratio (so-called "slab") or be designed as prism element.

The polarizer arrangement advantageously splits the radiation into two radiation parts, which are polarized perpendicularly with respect to one another, at an exactly defined angle and offset or superimposes two such radiation parts, which are polarized perpendicularly with respect to one another, at an exactly defined angle and offset, and the alignment of the polarizer surfaces with respect to one another is typically better than 10".

The polarizers are advantageously connected to a base body by optical contact bonding. The high accuracy with respect to the parallelism of the base body is thereby transferred to the alignment of the polarizers to obtain the desired parallel superimposition of the partial beams having different polarizations, thereby advantageously maintaining the beam quality with diffraction-limiting radiation.

The polarizers are advantageously only partially coated on one or both polarizer surfaces, thereby enabling optical contact bonding to a base body in the non-coated part of the polarizer.

The polarizers can alternatively be glued to a common base body or be mounted to a carrier element using a stop on a reference body and adhesive. The invention also includes all other suitable joining techniques with intimate contact and equivalent effect.

The polarizer arrangement can alternatively be provided from monolithic components.

The arrangement of the optical insulator can also be configured in such a fashion that one or more Faraday media are arranged within the aperture and a 1-stage or multi-stage insulator is provided by folding the optical path and passing it several times through the magnetic field, which improves optical insulation, while at the same time requiring little space.

The arrangement of the optical insulator can also be configured in such fashion that two or more inventive optical insulators are arranged behind one another, thereby providing a 2-stage or multi-stage insulator. In this case, the contacting magnets can be melted to each other between the individual stages, which improves optical insulation, while at the same time requiring little space.

It is clear that the features mentioned above and explained below can be used not only in the mentioned combinations but also in other combinations or individually without departing from the scope of the present invention.

The invention is explained in more detail below with reference to the attached drawings, which also disclose features that are essential to the invention. In the drawings:

FIG. 1*a* shows a schematic view of an annular magnet arrangement (prior art);

FIG. 1*b* shows scaling of an annular magnet arrangement (prior art);

FIG. 2*a* shows a schematic view of an inventive cube-shaped magnet arrangement;

FIG. 2*b* shows scaling of an inventive cube-shaped magnet arrangement;

Figure 6:
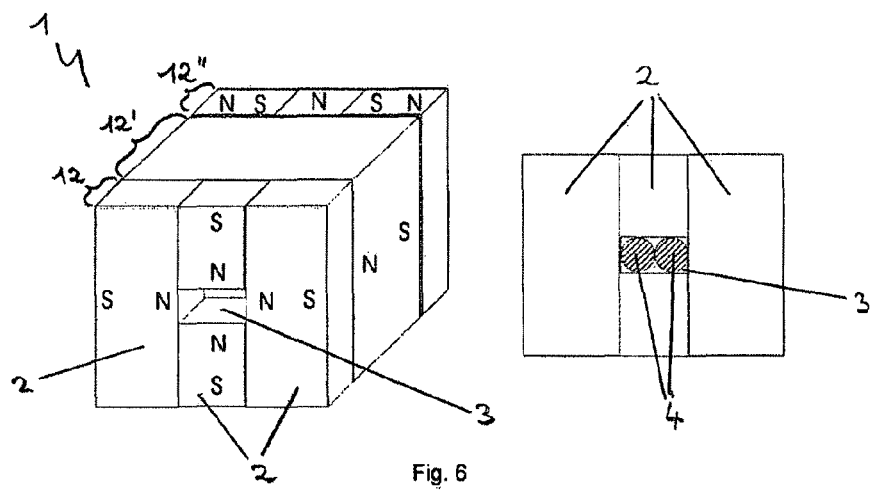
FIG. 6 shows an inventive embodiment of a compact cube-shaped magnet arrangement for 2 rod-shaped Faraday media.
Figure 9A:
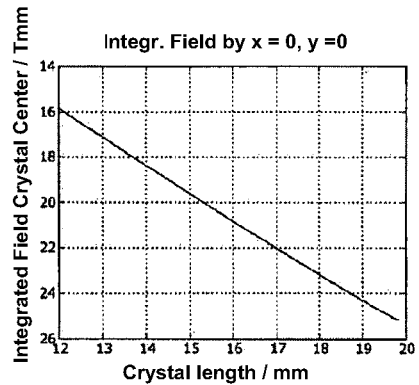
Figure 9B:
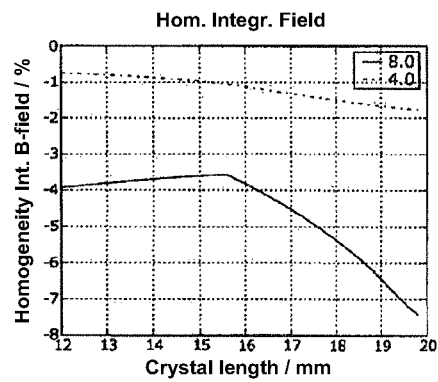
Figure 10A:
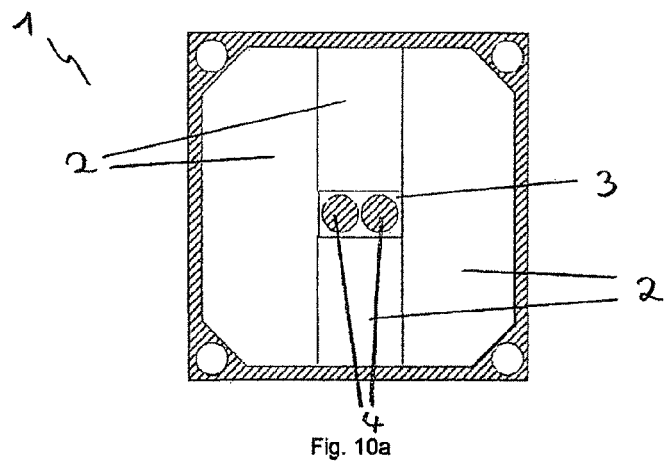
Figure 10B:
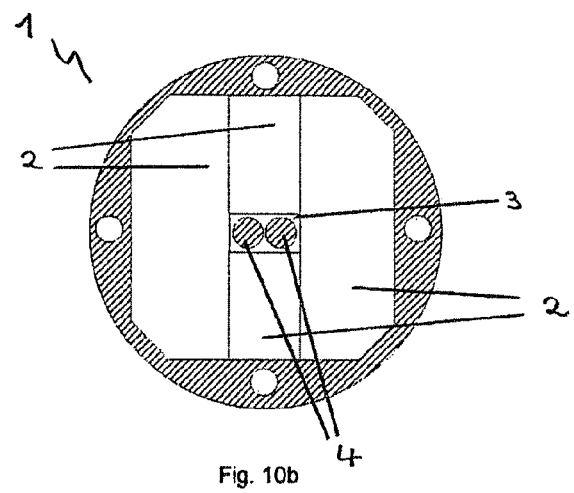
Figure 11:
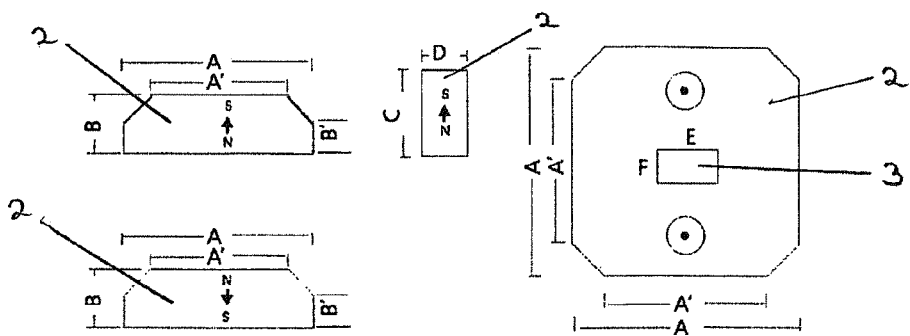
Figure 12:
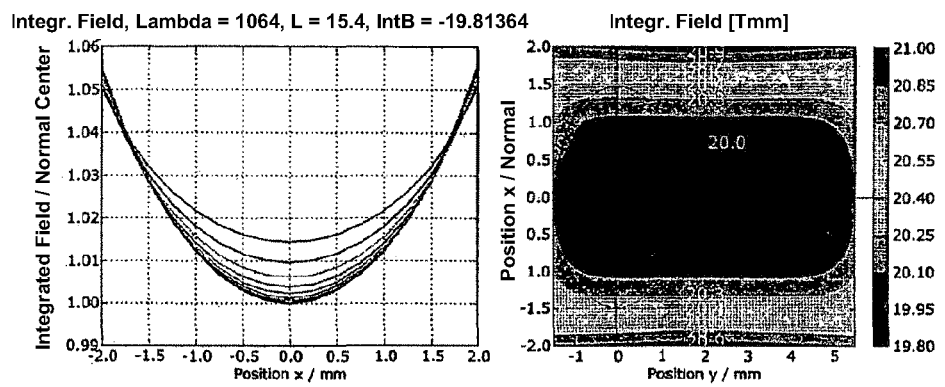
Figure 13:
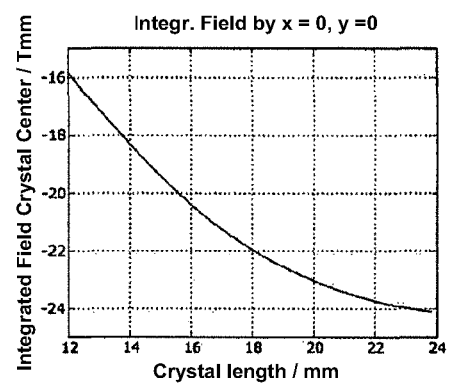
Figure 14:
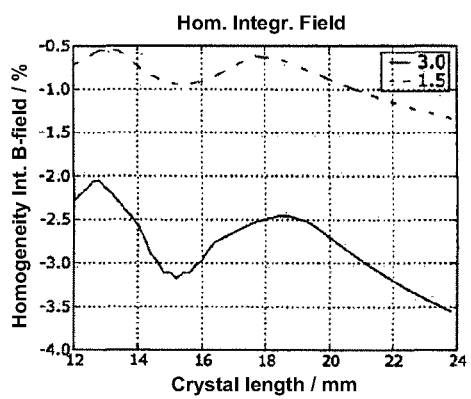
Figure 15:
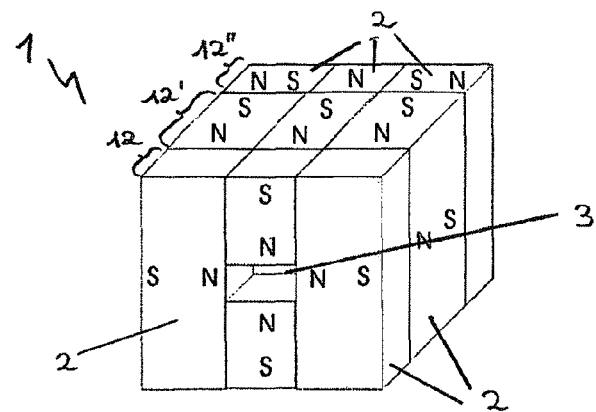
Figure 16:
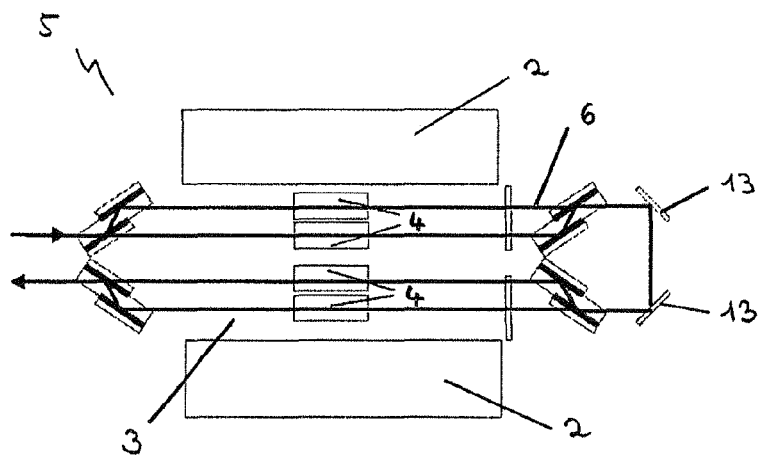
Figure 17:
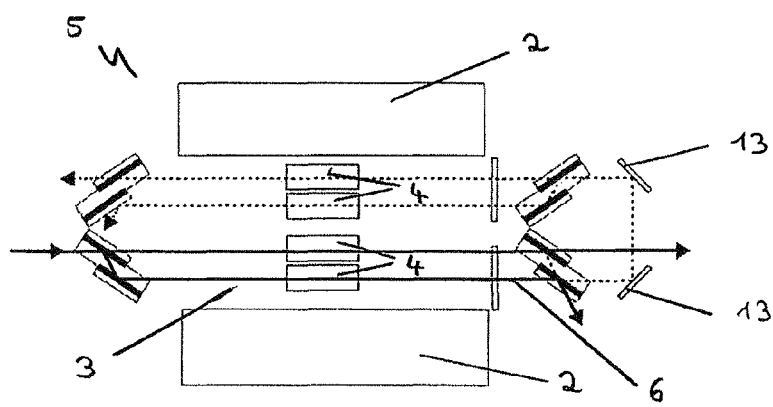
Figure 18:
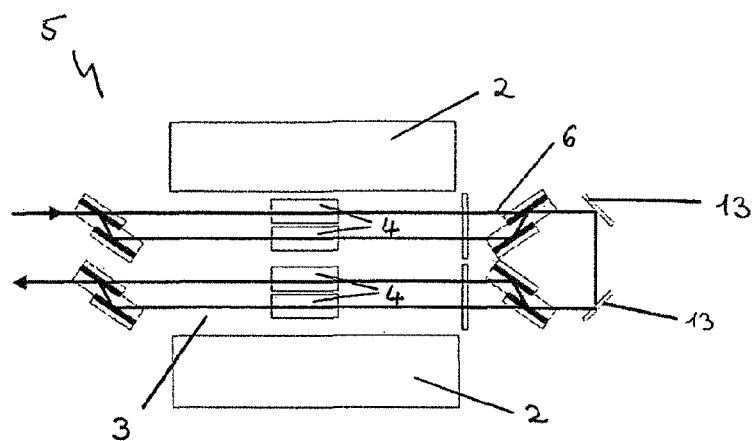
Figure 19:
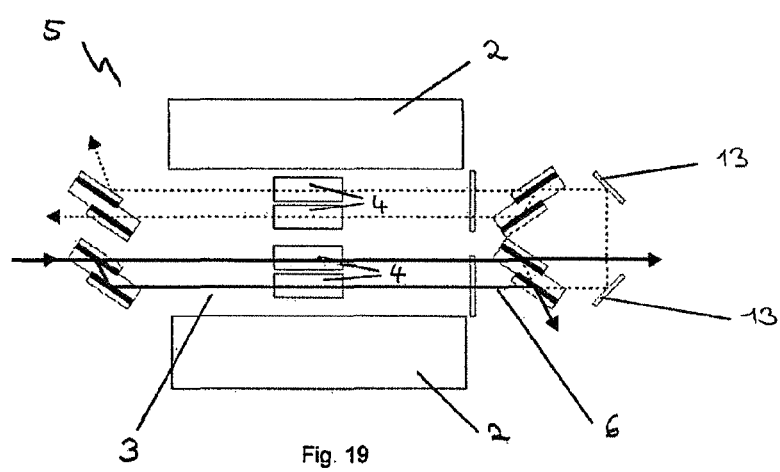
Figure 20:
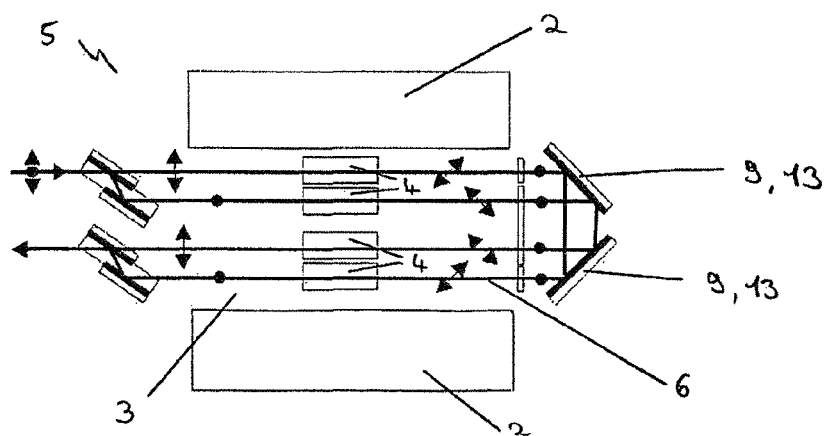
Figure 21:
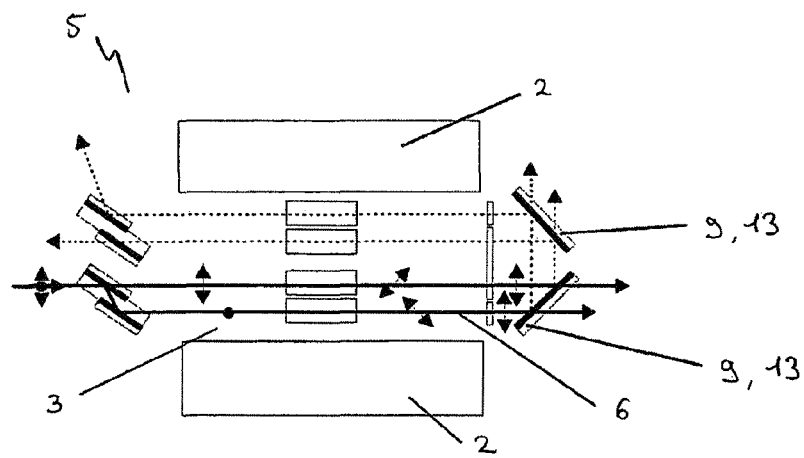
Figure 22:
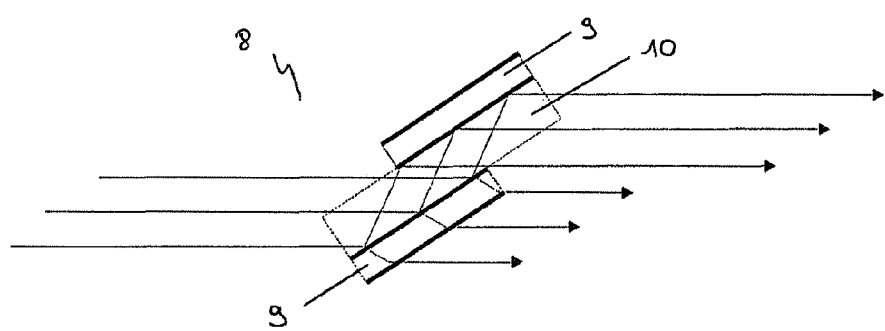
Figure 23:
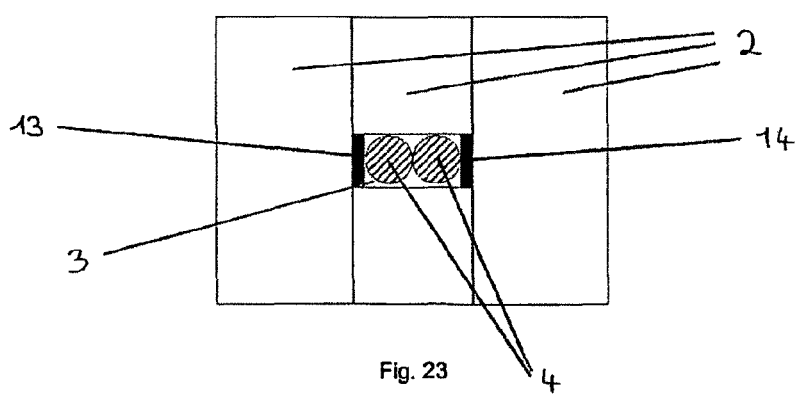
Figure 24:
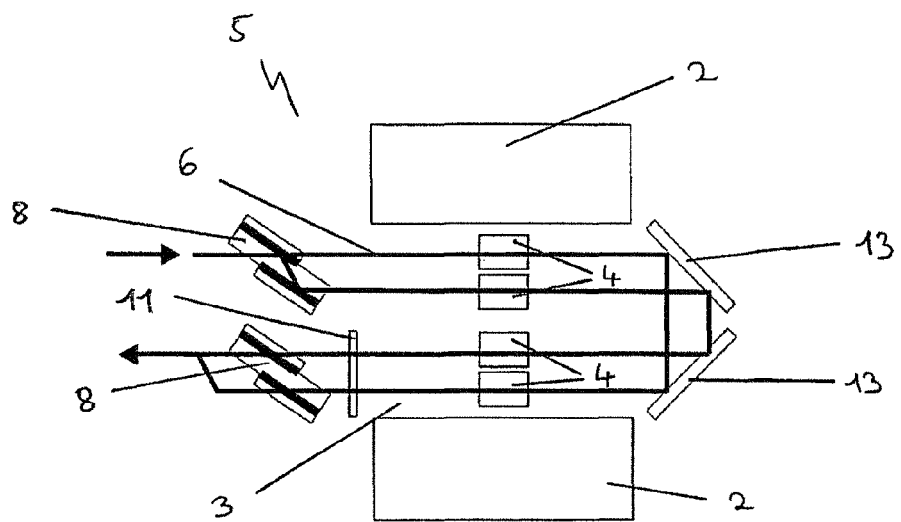
Figure 25:
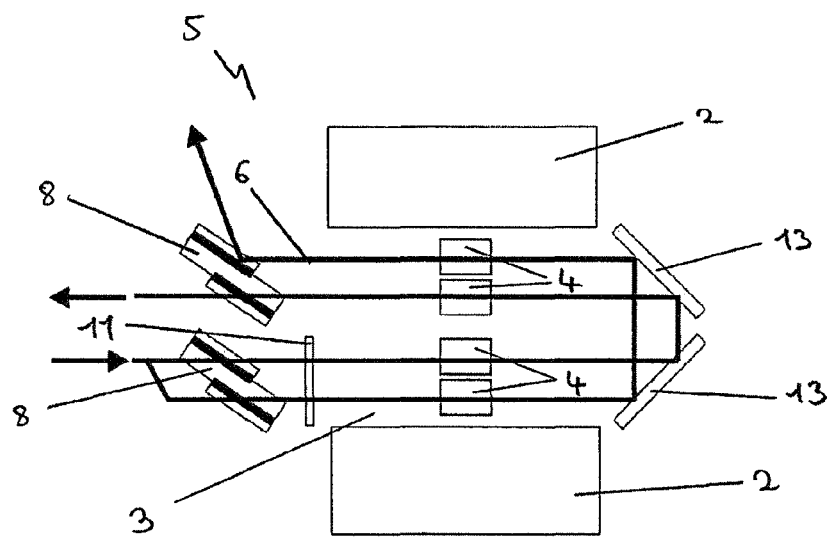
Figure 26:
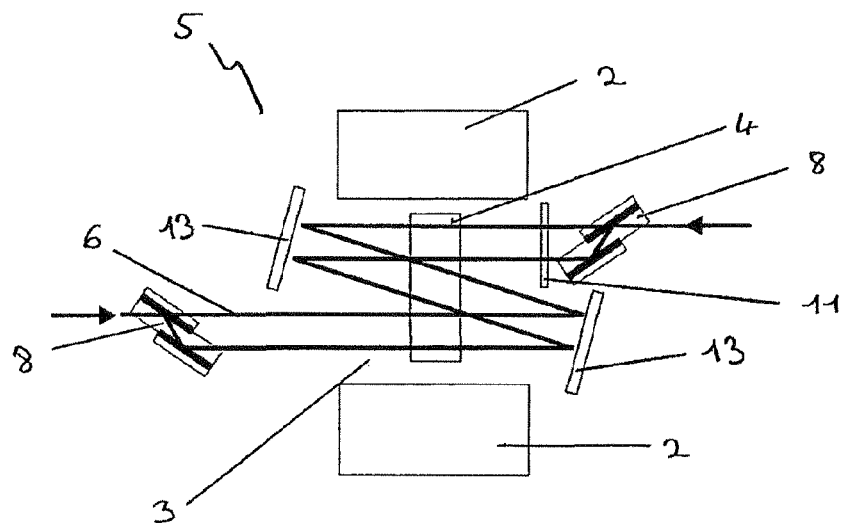
Figure 27:
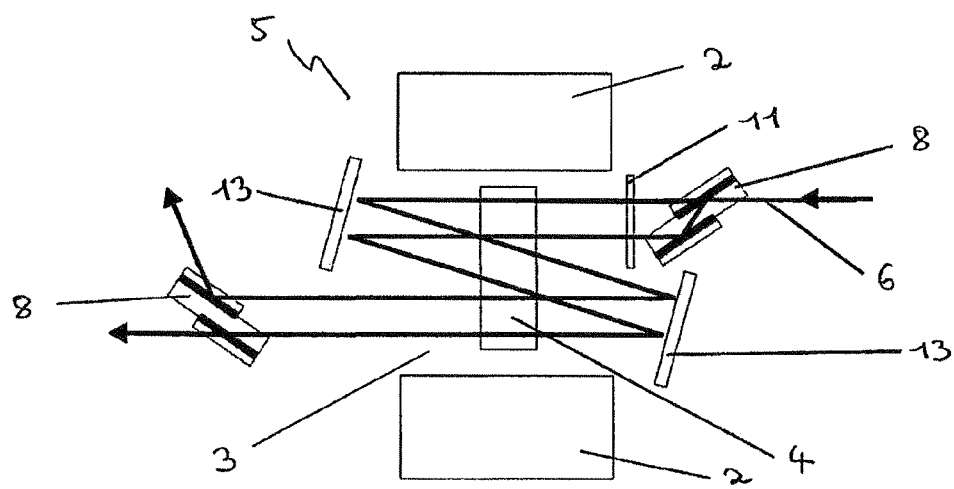

FIG. 9*a* shows the calculation of the strength of the magnetic field, which is integrated along the optical axis, in dependence on the crystal length of the Faraday medium in accordance with the inventive embodiment of FIG. 6;

FIG. 9b shows the calculation of the homogeneity of the magnetic field, which is integrated along the optical axis, in dependence on the crystal length of the Faraday medium in accordance with the inventive embodiment of FIG. 6;

FIG. 10a shows a schematic view of an inventive embodiment of the magnets, wherein the magnet arrangement has chamfered outer corners;

FIG. 10b shows a schematic view of a further inventive embodiment of the magnets, wherein the magnet arrangement has chamfered outer corners;

FIG. 11 shows a sectional view of magnets of a further inventive embodiment;

FIG. 12 shows a simulation of the integrated magnetic field along the optical axis in accordance with the magnet arrangement of FIG. 10a using the magnets in FIG. 11;

FIG. 13 shows the calculation of the strength of the magnetic field integrated along the optical axis in dependence on the crystal length of the Faraday medium in accordance with the inventive embodiment of FIG. 10a;

FIG. 14 shows the calculation of the homogeneity of the magnetic field integrated along the optical axis in dependence on the crystal length of the Faraday medium in accordance with the inventive embodiment of FIG. 10a;

FIG. 15 shows a schematic view of a further inventive magnet arrangement consisting of twelve cube-shaped magnets;

FIG. 16 shows a schematic view of an inventive two-stage optical insulator with optical path in the transmission direction;

FIG. 17 shows a schematic view of the inventive two-stage optical insulator of FIG. 16 with optical path in the blocking direction;

FIG. 18 shows a schematic view of a further inventive two-stage optical insulator with optical path in the transmission direction;

FIG. 19 shows a schematic view of a further inventive two-stage optical insulator of FIG. 18 with optical path in the blocking direction;

FIG. 20 shows a schematic view of a further inventive two-stage optical insulator with optical path in the transmission direction;

FIG. 21 shows a schematic view of the further inventive two-stage optical insulator of FIG. 20 with optical path in the blocking direction;

FIG. 22 shows a schematic view of a further inventive polarizer arrangement consisting of two polarizers which are connected to a common base body by optically contact bonding;

FIG. 23 shows an inventive embodiment of a compact cube-shaped magnet arrangement for two rod-shaped Faraday media with spacers in the free aperture;

FIG. 24 shows a schematic view of a further inventive folded optical insulator with optical path in the transmission direction;

FIG. 25 shows a schematic view of a further inventive folded optical insulator of FIG. 24 with optical path in the transmission direction;

FIG. 26 shows a schematic view of a further inventive folded optical insulator with optical path in the transmission direction;

FIG. 27 shows a schematic view of a further inventive folded optical insulator of FIG. 26 with optical path in the transmission direction.

Figure 1A:
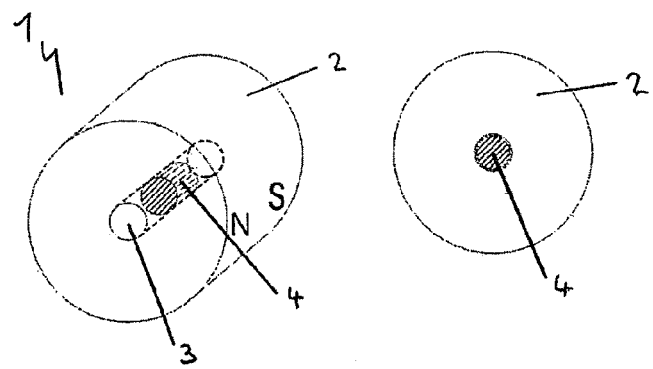
Figure 1B:
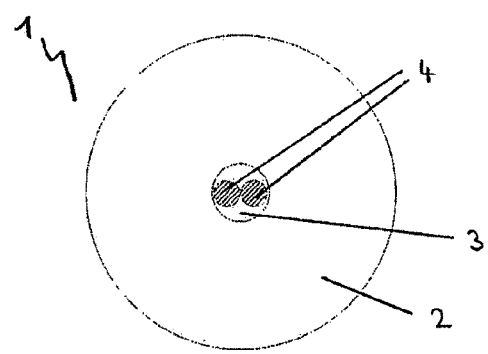

The embodiments shown in FIGS. 1a and 1b relate to conventional arrangements, wherein the magnet arrangement (1) consists of cylindrical magnets (2) with an aperture (3) and a Faraday medium (4) in the aperture (3).

The embodiments shown in FIGS. 2 to 27 refer to inventive embodiments of the optical insulator and its components.

Figure 2A:
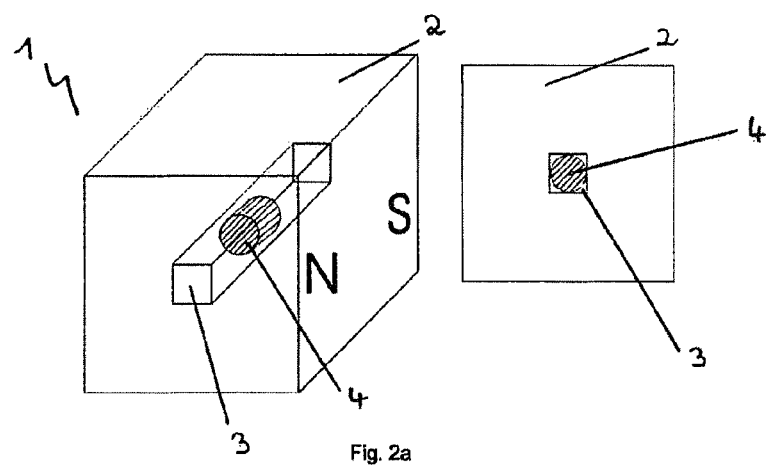

The embodiment shown in FIG. 2a is a schematic illustration of the magnet arrangement (1) consisting of cube-shaped magnets (2), which generate an aperture (3) that corresponds to the diameter of the Faraday medium (4).

Figure 2B:
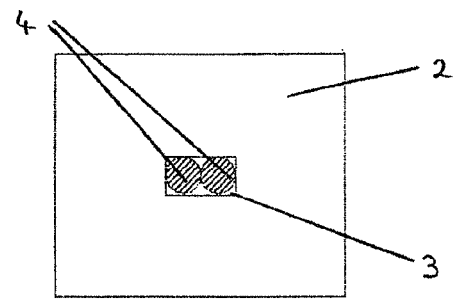

FIG. 2b shows an embodiment of the magnet arrangement (1) consisting of cube-shaped magnets (2) that generate an aperture (3) that corresponds in one direction to twice the diameter of a Faraday medium (4) such that two Faraday media (4) can be arranged next to one another within the aperture (3).

Figure 3:
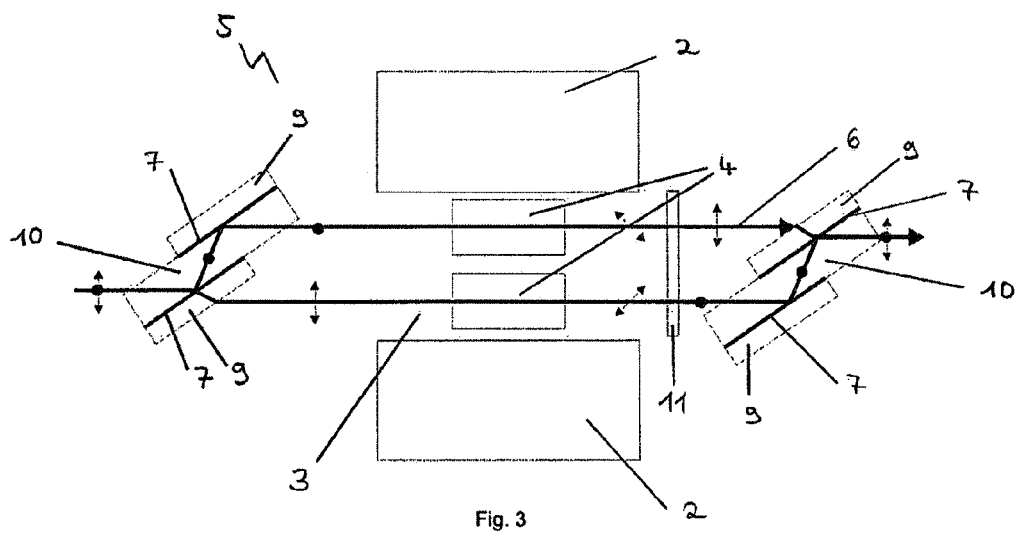
FIG. 3 shows a schematic view of an inventive optical insulator with optical path in the transmission direction.
Figure 4:
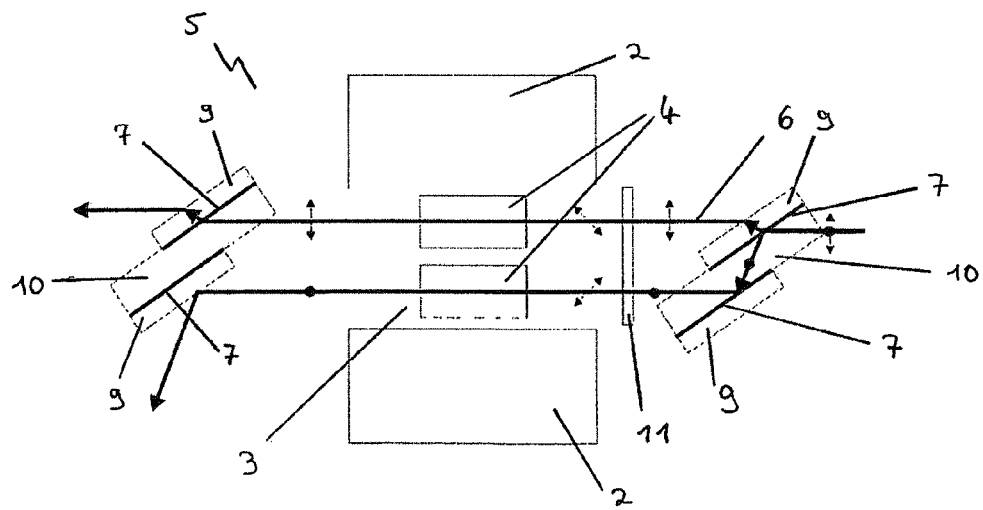
FIG. 4 shows the schematic view of an inventive optical insulator of FIG. 3 with optical path in the blocking direction.
Figure 5:
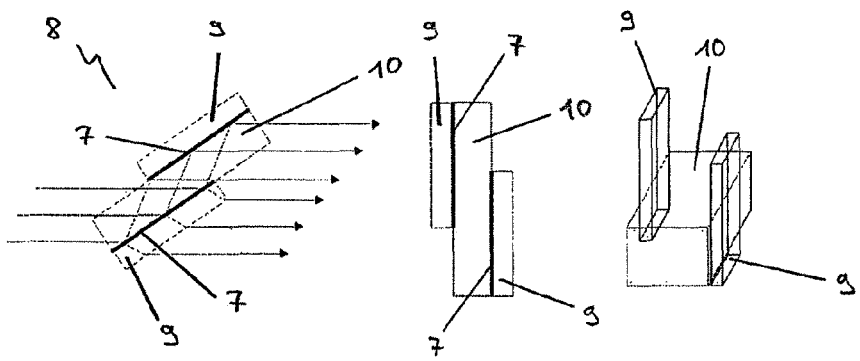
FIG. 5 shows a schematic view of the inventive polarizer arrangement consisting of 2 polarizers which contacted to a common base body by optical contact bonding.

FIGS. 3 and 4 show a preferred inventive embodiment of the insulator (5) with optical path (6) in the transmission (FIG. 3) or blocking direction (FIG. 4). The optical path lengths of the two polarization directions of this arrangement are the same such that the two polarizations are very well superimposed downstream of the arrangement, wherein the accuracy of the superimposition corresponds to the accuracy of the alignment of the polarizer surfaces (7) with respect to one another and is typically <10". The inventive polarizer arrangement (8) consists of two Brewster polarizers (9) which are advantageously connected to a common base body (10) of the same material by optical contact bonding (FIG. 5). A polarization rotator (11) is also illustrated which, when added to a Faraday rotator, generates rotation of polarization through 0° or 90°, thereby permitting alignment of the polarizers (9) in one plane.

The polarizer coating (not shown) is thereby applied to only part of one of the two polarizer surfaces (7) such that in the area without coating, optical contact bonding to a base body (10) is possible, as is schematically illustrated in FIG. 5. This transfers the high accuracy of the base body (10) to the alignment of the polarizer surfaces (7) with respect to one another.

The embodiment shown in FIG. 6 is a schematic illustration of an inventive magnet arrangement (1) which consists of 8 cube-shaped magnets (2), and a cube-shaped magnet (2) with a bore. Three magnetic planes (12, 12', 12") are thereby formed, wherein the first and the third plane (12, 12") are each composed of 4 cube-shaped magnets (2) and the second (central) plane (12') is formed by the magnet (2) with the bore. The size of the bore corresponds to the free aperture (3) of the surrounding magnetic planes (12, 12") which again corresponds in one direction to twice the diameter of the Faraday medium (4) such that two Faraday media (4) can be arranged next to one another.

Figure 7:
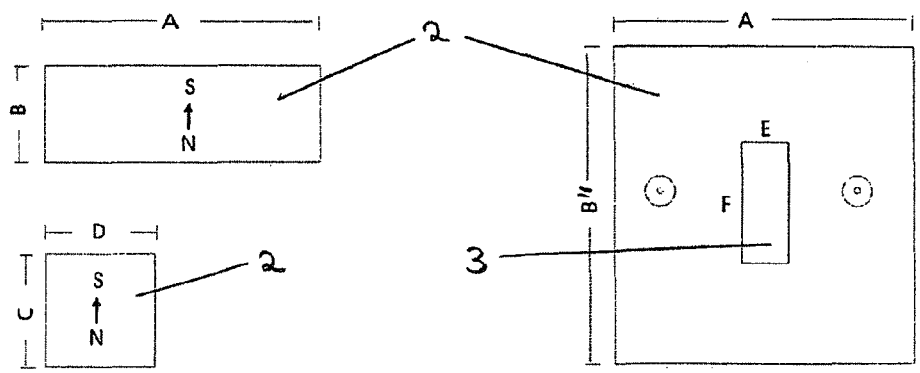
FIG. 7 shows a sectional view of magnets of an inventive embodiment.

FIG. 7 shows the dimensions of magnets (2) for the magnet arrangement (1) schematically illustrated in FIG. 6 with magnets (2) of class N40UH with a residual magnetization of Br=1.28 T. The length of the edges A and B or B" and C and D are A=65 mm, B=18.5 mm, B"=63 mm, C=27.8 mm and D=25.8 mm in the present case. The height h of the magnets (2), which cannot be illustrated in the sectional view, is in this special case h=20 mm for all three magnets (2). The free aperture (3) is E×F, wherein, by way of example, E=9.3 mm, and F=26 mm in the present case and the crystal length of the Faraday medium (4) is designed to be approximately 15 mm for a wavelength of 1064 mm.

Figure 8:
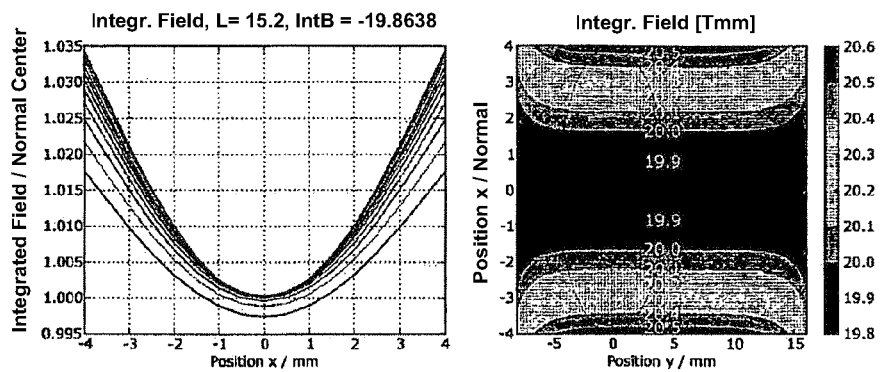
FIG. 8 shows a simulation of the integrated magnetic field along the optical axis in accordance with the magnet arrangement of FIG. 6 using the magnets of FIG. 7.

This arrangement achieves a very homogeneous magnetic field, which is integrated along the optical axis, with a deviation of less than 4% over a height and width of 8 mm, or less than 1% over a height and width of 4 mm, as is shown in the simulation of FIG. 8 and in the calculations of FIGS. 9a and 9b.

FIGS. 10a and 10b show further inventive embodiments of the magnet arrangement (1). The shown magnets (2) are magnets (2) of class N40UH with a residual magnetization of Br=1.28 T. The free aperture (3) of the magnet arrangement is E×F, wherein E=5 mm and F=8 mm, and is designed for a crystal length of the Faraday medium of approximately 15 mm and for a wavelength of 1064 mm. The cube-shaped magnets (2) of the magnet arrangement (1) are chamfered at the outer corners of the arrangement (1), thereby reducing the lengths A and B of the edges by a certain amount to an edge length of A' and B'.

In the present example, the edge lengths are A=34 mm, A'=24 mm, B=13 mm, B'=8 mm, C=14.5 mm and D=7.6 mm. The height h of the magnets (2) is h=15 mm, and the height of the magnets (2) with bore is h'=14 mm. The dimensions of the magnets (2) shown in FIG. 11 generate a very homogeneous magnetic field, which is integrated along the optical axis, with a deviation of less than 3.5% over the height and width of 3 mm or less than 1% over a height and width of 1.5 mm. FIGS. 12 to 14 show the associated simulations and calculations analogous to the previous embodiment.

The embodiment of the magnet arrangement (1) shown in FIG. 15 consists of twelve cube-shaped magnets (2), wherein three magnetic planes (12, 12', 12") are again formed, which are each composed of four cube-shaped magnets (2) in the present embodiment. This is advantageous in that the magnets (2) can be produced in a simple and therefore inexpensive fashion.

FIGS. 16 and 17 show an inventive two-stage embodiment of the optical insulator (5) with four Faraday media (4) that are arranged within the aperture (3). The serial passage through two optical insulators (5) using folding elements (13), such as e.g. mirrors, enables a very compact arrangement (two-stage optical insulator). This is advantageous in that insulation is improved, while at the same time minimizing the additional space that is required. The optical path (6) is shown in the transmission direction (FIG. 16) and in the blocking direction (FIG. 17).

FIGS. 18 and 19 show a further inventive embodiment of a two-stage optical insulator (5) for unpolarized radiation. Analogous to FIGS. 16 and 17, the optical path (6) is shown in the transmission direction (FIG. 18) and also in the blocking direction (FIG. 19). In this embodiment, the optical path (6) is different for the two polarization directions, thereby preventing interference effects due to coherent superimposition.

FIGS. 20 and 21 show a further inventive embodiment of a 2-stage optical insulator (5). Analogous to the previous embodiments, the optical path (6) is shown in the transmission direction (FIG. 20) and also in the blocking direction (FIG. 21). In this embodiment, four Faraday media (4) are arranged in the free aperture (3). Serial passage through two optical insulators (5) provides a very compact arrangement. In contrast to the two previous embodiments, the folding elements (13) are designed as polarizers (9), thereby providing a structure with fewer optical elements.

FIG. 22 shows a schematic illustration of a further inventive polarizer arrangement (8) consisting of two polarizers (9) which are connected to a common base body (10) by optical contact bonding. At least one of the polarizers (9) of this arrangement is coated on both sides, thereby improving the extinction in the blocking direction. One further advantage of such a arrangement consists in that the tensions that are introduced by the coating and can cause deformation of the substrate can reliably compensate each other in this fashion, thereby avoiding or at least minimizing deformation.

Further inventive embodiments relate to an optical insulator (5) for linear polarization, which can be designed as a one-stage or two-stage insulator analogous to the above illustrated embodiments of optical insulators (5) and can be designed to be folded or not folded (not shown).

In a further inventive embodiment of the optical insulator (5), the optical paths (6) are continued at an angle after passage through the polarizers (9) with the result that only one Faraday medium (4) can be provided while the functionality of the arrangement remains the same.

In a further embodiment of the 2-stage optical insulator (5), the magnetic planes (12, 12', 12", 12''', 12'''') of the magnet arrangement (1) can be disposed behind one another (non-folded embodiment), wherein contacting magnets (2) of the third and fourth magnetic planes (12', 12''') can be melted together (not shown).

The inventive embodiment of the magnet arrangement (1) shown in FIG. 23 consists of cube-shaped magnets (2) with spacers (14) in the free aperture (3), in which two Faraday media (4) are disposed in the present exemplary case.

FIGS. 24 and 25, as well as 26 and 27 show further inventive embodiments of the insulator (5) in each case with the optical path (6) in the transmission or blocking direction, wherein the insulator (5) is folded in such a fashion that the optical path (6) passes twice through the insulator (5).

The advantage of the arrangement shown in FIGS. 24 and 25 consists in that the length in which a strong magnetic field must be generated in the free aperture (3) can be halved compared to the linear arrangement, which reduces the size of the required magnet arrangement (1).

The advantage of the arrangement shown in FIGS. 26 and 27 consists in that the length in which a strong magnetic field must be generated in the free aperture (3) can be reduced to a third compared to the linear arrangement, which further reduces the size of the required magnet arrangement (1).

A further advantage of this arrangement consists in that a suitable design of the optical paths in the Faraday medium (4), which can have the shape of a slab, improves the distribution of the absorbed power compared to a rod, and suitable dissipation of the heat via the large surfaces of the Faraday medium (4) improves insulation while at the same time providing high power.

It is clear that the invention also includes folds with triple and multiple passages through the magnet arrangement (1) (not shown).

The invention claimed is:

1. Optical insulator comprising:
    a Faraday rotator comprising one or more Faraday media and a magnet arrangement which enables accommodation of several Faraday media (4); and
    a first polarizer arrangement upstream of the Faraday media (4);
    a second polarizer arrangement downstream of the Faraday media,
    wherein the magnet arrangement comprising magnets forming a free aperture wherein the Faraday media is located within the free aperture, and wherein the first polarization arrangement splits the optical radiation into two radiation parts, which are polarized perpendicularly with respect to one another, at an exactly defined angle and offset, or superimposes two radiation parts, which are polarized perpendicularly with respect to one another, at an exactly defined angle and offset, and the first and second polarizer arrangements enable alignment of the polarizer surfaces with respect to one another of better than 10".

2. Optical insulator of claim 1, wherein the outer corners of the magnet arrangement are chamfered.

3. Optical insulator of claim 1, wherein the magnet arrangement generates a magnetic field of 0.7 T inside the free aperture.

4. Optical insulator of claim 1, wherein the edge length of the free aperture of the magnet arrangement corresponds to at least the diameter of one of the Faraday media.

5. Optical insulator of claim 4, wherein the free aperture of the magnet arrangement corresponds to at least the diameter of one of the Faraday media and is smaller than twice this diameter.

6. Optical insulator of claim 1, wherein the free aperture of the magnet arrangement corresponds to at least the added diameters of the Faraday media in the respective direction and is smaller than twice the added diameters.

7. Optical insulator of claim 1, wherein the optical insulator has at least one polarization rotator that rotates the polarization direction of the optical radiation together with at least one of the Faraday media in one direction through 0° and in the opposite direction through 90°.

8. Optical insulator of claim 1, wherein the first and second polarization arrangements comprise several components.

9. Optical insulator of claim 1, wherein the first and second polarizer arrangements comprise each polarizer connected to a common base body by optical contact bonding.

10. Optical insulator of claim 9, wherein the polarizers are glued to a common base body or are mounted to a carrier element using a stop on a reference element and adhesive.

11. Optical insulator of claim 1, wherein the one or more Faraday media are arranged inside the free aperture and a one-stage or multi-stage insulator is provided through folding of the optical path through folding elements and multiple passage of the magnetic field.

12. Optical insulator of claim 1, wherein two or more optical insulators are arranged behind one another, thereby providing a two-stage or multi-stage insulator.

13. Optical insulator of claim 12, wherein the magnets of the contacting magnetic planes are melted together.

14. Optical insulator of claim 1, wherein spacers for the magnets are arranged in the free aperture of the magnet arrangement.

15. The arrangement for an optical insulator of claim 1, wherein the magnets are cube-shaped.

16. Optical insulator comprising:
a Faraday rotator comprising one or more Faraday media and a magnet arrangement which enables accommodation of several Faraday media;
a first polarizer arrangement upstream of the Faraday media; and
a second polarizer arrangement downstream of the Faraday media; the Faraday media being located within a free aperture of the magnet arrangement, wherein the magnet arrangement comprises three magnetic planes having a continuous aperture,
wherein the first and the third magnetic planes are each composed of four cube-shaped magnets, which are arranged around the aperture, and
wherein the middle magnetic plane is composed either by one single cube-shaped magnet having a bore which forms the aperture or by four cube-shaped magnets, which are arranged around the aperture.

* * * * *